March 28, 1950 W. RUML, JR 2,501,830

RECEIVER CAP FOR EARRINGS

Filed Nov. 10, 1948

INVENTOR
WENTZLE RUML JR.
John T. Marvin
his ATTORNEY

Patented Mar. 28, 1950 2,501,830

UNITED STATES PATENT OFFICE 2,501,830

RECEIVER CAP FOR EARRINGS

Wentzle Ruml, Jr., East Orange, N. J.

Application November 10, 1948, Serial No. 59,350

4 Claims. (Cl. 179—182)

This invention relates to improvements in telephone receiver caps and is particularly concerned with telephone receiver caps having a portion thereof cut away.

It is one of the objects of the invention to provide a telephone receiver cap wherein the raised annular rim thereof is cut away at a predetermined point to permit greater comfort in the use of the receiver. It has been noted that women who wear earrings find it uncomfortable to use the telephone due to the fact that conventional receiver caps are so formed as to press against the earring during the use of the phone. The present cap is so designed as to provide a depression for the earring whereby the receiver may be conveniently used with the earring in place.

Further objects and advantages of the present invention will be apparent from the following description, reference being had to the accompanying drawings wherein a preferred embodiment of the present invention is clearly shown.

As previously stated, women have experienced discomfort using telephone receivers when wearing earrings. This discomfort is amplified when the wearer has to use the telephone frequently during the day. It has been observed that an improved form of telephone receiver cap wherein the annular rim portion thereof is cutaway a predetermined distance permits convenient use of the receiver without any loss of the efficiency of the instrument. I have found that the cutaway portion of the annular ridge cannot be less than 90° radially nor greater than 120° for proper use of the telephone. Depressions less than 90° in extent do not permit easy ingress of an earring and cuts greater than 120° do not permit sufficient contact with the ear to eliminate extraneous noises. Therefore the cutaway portion of the annular outer rim or ridge should not be less than 90° and more than 120° in extent.

Figure 1:
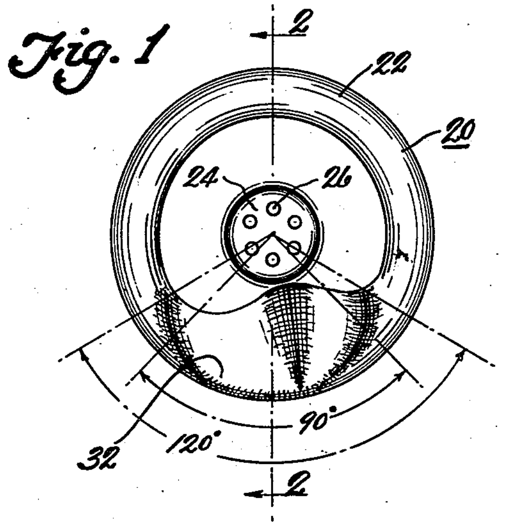
Fig. 1 is a plan view of a telephone receiver cap in the improved form.
Figure 2:
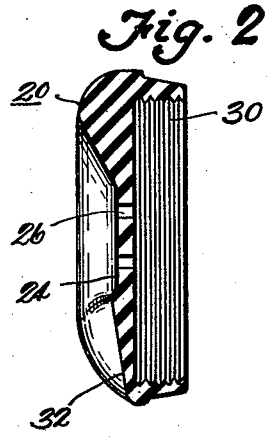
Fig. 2 is a cross section of said cap taken on line 2—2 of Fig. 1.

Specifically referring to Fig. 1, a plan view of a telephone receiver cap is shown at 20 which includes an annular raised ridge or rim portion 22 therearound with a depressed central portion

24 which is provided with a plurality of apertures or perforations 26 to permit passage of sound therethrough. The cap is threaded as at 30 for attachment to the remainder of the instrument. The ridge or raised annular portion 22 is cut away as at 32 to at least the same depth or plane as the depressed central portion 24. This permits an appreciable relief in the outer ridge which allows convenient use by the wearer of an earring. The extent of the cut away portion 32 is between 90° and 120° for reasons heretofore explained. The edges of the depression are obviously chamfered or rounded for convenience and comfort.

Figure 3:
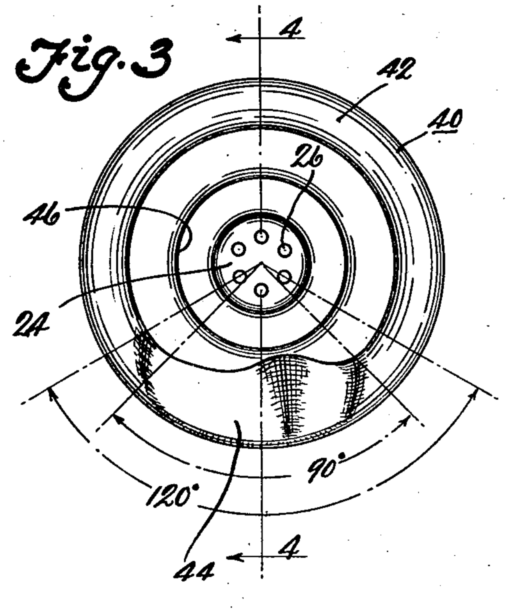
Fig. 3 is another embodiment of the invention pertaining to an auxiliary soft rubber cap which may be slipped over a conventional telephone receiver.
Figure 4:
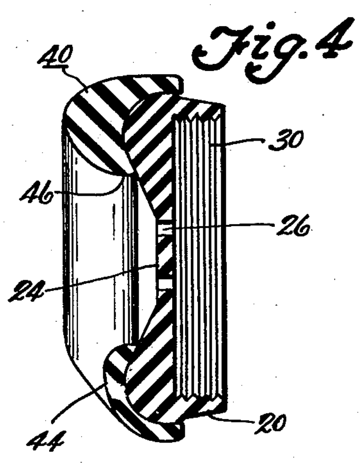
Fig. 4 is a section taken on line 4—4 of Fig. 3.

In some instances, the improved cap may be made as an accessory of soft rubber as shown at 40 in Fig. 3. The accessory cap 40 includes a raised annular outer rim 42 therearound which is cutaway at 44 as noted hereinbefore. The entire cap 40 may be made to snap over a conventional receiver cap 20 as shown in Fig. 4. The accessory cap 40 is merely an annular band of soft rubber having an open central portion as shown at 46 around the perforated central portion 24 of the main receiver cap.

It is apparent that the present invention provides an improved cap for use with telephone receivers which has high utility through increased efficiency within an office staff. It is simple to install and inexpensive to fabricate. In the installation of such a cap it will be noted that if the threads 30 are made snug, the cap may be rotated at least three fourths to one turn to properly position the depressed outer portion 32 for greatest convenience of the user and that the cap will remain in such a position. In fact present conventional caps of telephone receivers may be rotated a turn or more without injuring the efficiency of the instrument and without change to the position during use.

This improved receiver cap may also be used by persons wearing hearing aids, wherein the hearing aid projects from the ear and the electrical connections thereto drop downwardly from the instrument. In this case the cutaway portion of the receiver cap permits greater contact of the cap with the ear without the uncomfortable pressure of the cap pressing the hearing aid and the like into the lobe of the ear. In all cases, due to the restricted cut-away portion the cap may be used efficiently by persons not wearing earrings or hearing aids. Thus it is feasible to equip any receiver with the improved cap whereby the telephone may be used with complete comfort and efficiency by any number of persons.

While the embodiments of the present invention as herein disclosed, constitute preferred forms, it is to be understood that other forms might be adopted.

What is claimed is as follows:

1. A receiver cap for use with receivers comprising in combination, a molded main body having an annular raised outer rim or ridge, a depressed central portion with an aperture therethrough connecting with the receiver, and a depressed portion in said ridge having a radial extent of not less than 90° nor greater than 120°, the depth of said depression being at least the same in plane as the depressed central portion of said receiver cap.

2. A receiver cap for use with receivers of telephones and like intruments comprising in combination, a molded rubber-like article having a raised annular outer rim, said outer rim having a cut away depressed portion therein of an extent of at least 90° and not more than 120°, and a depressed central portion in said cap communicating with the receiver, said cutaway depressed portion being in substantially the same plane as said depressed central portion.

3. A receiver cap for telephone receivers and the like comprising in combination, a molded rubber-like receiver cap, a soft rubber annulus having a raised outer rim, a depressed portion in said rim having an extent of not less than 90° nor greater than 120°, and a central aperture through the annulus communicating with the receiver diaphragm, said annulus having sufficient resiliency to be snapped over the molded rubber-like receiver cap.

4. A receiver cap for use with receivers for telephones and like instruments, comprising in combination, a molded main body, an annular raised outer rim on said body, a depressed central portion having an aperture therethrough connecting with the receiver, and a depressed portion in said rim of sufficient radial extent to provide means to accommodate an earring or the like and being sufficiently limited in extent to constitute means for preventing the introduction of extraneous noises into the ear of the user when the receiver cap is in use, the depth of said depressed portion extending substantially to the same plane as the depressed central portion of said receiver cap.

WENTZLE RUML, Jr.

REFERENCES CITED

The following references are of record in the file of this patent:

UNITED STATES PATENTS

| Number | Name | Date |
|---|---|---|
| 1,368,307 | Waldron | Feb. 15, 1921 |
| 1,558,191 | Lindemann | Oct. 20, 1925 |
| 1,615,028 | Morsen | Jan. 18, 1927 |

FOREIGN PATENTS

| Number | Country | Date |
|---|---|---|
| 133,982 | Great Britain | Oct. 16, 1919 |